Figure 1:
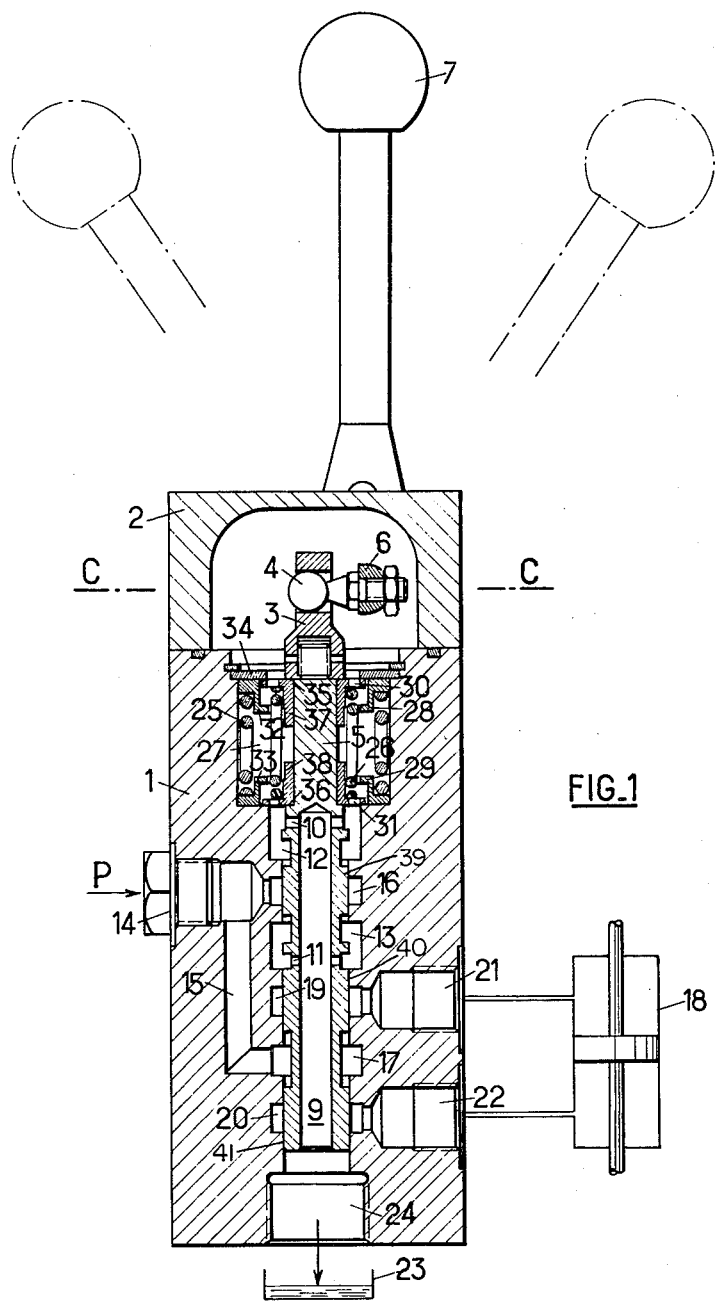

Dec. 7, 1965   J. FAISANDIER   3,221,770
HYDRAULIC DISTRIBUTOR VALVE AND BY-PASS MEANS
Filed Feb. 16, 1962   2 Sheets-Sheet 1

FIG_2
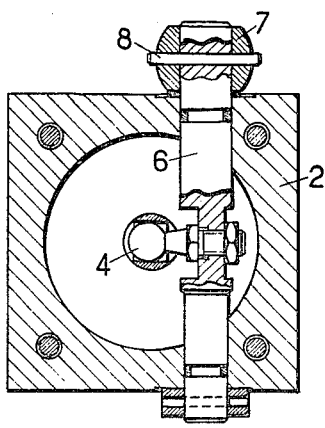
FIG_3
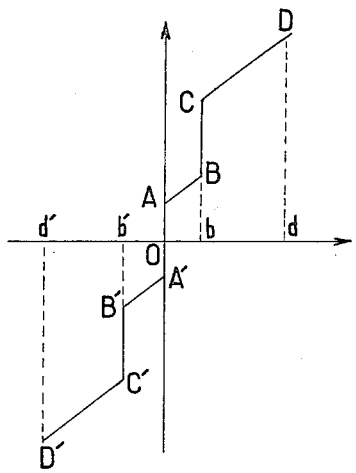

United States Patent Office 3,221,770
Patented Dec. 7, 1965

3,221,770
HYDRAULIC DISTRIBUTOR VALVE AND
BY-PASS MEANS
Jacques Faisandier, 32 Blvd. Felix Faure,
Chatillon-sous-Bagneux, France
Filed Feb. 16, 1962, Ser. No. 173,778
Claims priority, application France, Mar. 3, 1961, 854,477
5 Claims. (Cl. 137—596.13)

In pending application Ser. No. 114,997 of June 5, 1961, now Patent No. 3,087,307, dated April 30, 1963, the applicant has disclosed, among other things, a hydraulic distributor valve normally functioning with a closed center but so constituted as to act momentarily with open center as soon as the displaceable valve element of the distributor valve is slightly displaced in one or the other direction, the action reverting to the conventional action with closed center as soon as the displaceable valve element is further displaced appreciably away from the neutral position, that is, away from the transistory position at which the distributor valve works with open center.

The reasons for having a bypass position on each side of the neutral closed center position, as explained in said patent, are to promote a transistory variation of pressure upstream of the inlet of the distributor, that is, in the pressure circuit, whereby said variation may be utilized at a distance in said pressure circuit to control a device such as a valve or the like.

Said patent has stressed the importance of indicating this transistory position by a catch stop in order to allow the operator to let the pressure in the circuit fall to its minimum, the value of which is determined by a decompression valve included in the hydraulic circuit and which is a separate device also described in the said patent.

According to the present invention the catch stop is replaced with an advantage by a device with prestressed spring giving, for each direction of operation, two thresholds the most displaced of which from the neutral point is used to give a manually detectable sensation which acts as a signal of the corresponding transistory position.

The device according to the invention has two helical springs, each mounted between two movable buffers, the buffers of the first spring being individually moved by the movement of the valve element of the distributor valve and each of the buffers of the other spring being individually moved by the corresponding buffer of the first spring, this movement of the second spring only taking place away from the transitory position of the displaceable valve element.

The invention consists in a hydraulic distributor with closed center comprising a bypass device allowing the pressure fluid to momentarily bypass said valve distributor, when the displaceable valve element is in a by-pass position defined at a slight displacement of said valve element with respect to its neutral position, characterized in that the by-pass position is indicated by a device giving a manually detectable signal and constituted by two springs compressible successively and as a result of the valve element movement, the first spring being compressible by displacement of the valve element as it moves from the neutral position, and the second spring being compressible by the displacement of the valve element as it moves from the bypass position.

The invention further consists in a hydraulic valve distributor with closed center comprising a bypass device allowing the pressure fluid to momentarily bypass said distributor valve when the valve element is in a bypass position defined by a slight displacement of said valve element with respect to its neutral position, characterized by a first spring and means to compress this first spring in response to the movement of the valve element as it moves from the neutral position, and by a second spring and means to compress this second spring in response to the valve element movement as it moves from the by-pass position.

An example of the inventive idea is now shown reduced to practice but it is not intended to limit the scope of the invention to the details shown, which are merely given by way of illustration.

On the accompanying drawings:

FIGURE 1 is a diagrammatic axial section of a distributor valve according to the invention, FIGURE 2 is a section along line C—C of FIGURE 1, and FIGURE 3 is a diagram showing forces exerted as a function of the position of the valve element.

The distributor body 1 is closed at its upper part by the hollow cap 2 in which is positioned a ball joint with housing 3 and ball 4. The housing 3 receives the end of a displaceable valve element or body valve 5 which is attached to it using a pin (not shown).

The end of ball 4 is fitted upon shaft 6 which passes fluid-tight through cap 1. Control lever 7 is keyed to shaft 6 by pin 8.

The displacement of the control lever to right or left of the neutral position thus allows the valve element 5 to be displaced upwards or downwards with respect to the neutral position in which it is shown.

The valve element 5 is hollow and has a longitudinally extending chamber 9 closed at the upper end, which chamber communicates with chambers 12 and 13, formed in the distributor body 1, by means of ports 10 and 11 respectively. Feed of pressure fluid takes place by conduit 14, duct 15 and annular spaces 16 and 17. Land means 39, 40 and 41 on the valve element define a neutral or closed center position as shown in FIG. 1 and two fluid distributing positions depending on direction of displacement of the valve element in the valve body.

The communication with jack 18 (which is controlled by the distributor, and is shown very diagrammatically) takes place by means of annular spaces 19 and 20 and the corresponding conduit 21 and 22.

The internal chamber 9 of the slide valve 5 communicates with the cistern or sump 23 by conduit 24.

The arrangement is otherwise the same as that shown in the said patent and its operation is only recalled summarily.

In the neutral position shown the center is closed, and annular spaces 16 and 17 only communicate with the pressure fluid feed.

A small upward displacement connects annular space 16 to the cistern via 13, 11, 9 and 24; a small downward displacement connects annular space 16 to the cistern via 12, 10, 9 and 24. These are the transitory positions in which the pressure falls more or less rapidly upstream of the inlet 14 in the hydraulic circuit (not shown).

Upon moving away from these transitory positions, the device functions with closed center, an upward displacement putting annular space 19 under pressure and a downward displacement putting annular space 20 under pressure, and consequently pressurizing the corresponding chambers of the jack.

To indicate these transitory positions helical springs 25 and 26, positioned with chamber 27 of distributor body 1 are used according to the present invention. The spring 25 presses upon the movable external buffers, formed as collars 28 and 29, and spring 26 presses upon movable internal buffers 30 and 31. Buffers 28 and 29 each have an internal shoulder 32 and 33 respectively, which may be engaged with buffers 30 and 31 respectively.

Buffers 29, 31 press against a shoulder of the distributor body and buffers 28, 30 upon the stop collar 34.

The internal buffers 30, 31 are engaged by two shoulders 35 and 36 respectively of the movable part (i.e., displaceable valve element 5) and are integral with sliding sleeves 37 and 38 respectively, which are the members which are stopped by shoulders 35 and 36.

The device works as follows:

If the valve element 5 is displaced downwards with respect to the position shown in FIGURE 1 it brings with it internal buffer 30, and spring 26 is accordingly compressed. When buffer 30 engages shoulder 32, external buffer 28 is also brought down and spring 25 becomes compressed, spring 26 of course still undergoing compression. There is thus a sudden increase in the force necessary to keep the control lever moving. This is known as a "threshold."

If valve element 5 is displaced upward, it carries with it internal buffer 31 and thus compresses spring 26. When buffer 31 engages shoulder 33, external buffer 29 is in turn carried upward and the spring 25 is then compressed, although spring 26 is still undergoing compression; thus, a second threshold, with respect to the neutral position, is provoked. The working of this double threshold device is shown in the graph of FIGURE 3, in which the ordinate shows force exerted and the valve element movement is shown upon the abscissae extending in both directions from O which is the neutral point. The graph is symmetrical about O. Threshold OA corresponds to the residual compression exerted upon spring 26 and threshold BC corresponds to the residual compression exerted upon spring 25 (that is, the quantities correspond to the force necessary to compress the springs into the dimensions as shown for the neutral position).

The distance $Ob$ corresponds to the compression of spring 26 only, until buffers 29 and 31 meet, and distance $bd$ corresponds to the compression of the two springs 25 and 26, until sleeves 37 and 38 meet.

Thus two thresholds BC, B'C' are obtained which will give a manually detectable signal to the operator to show the two transitory positions of valve element 5.

What I claim is:

1. In a hydraulic distributor valve including a valve body, a displaceable valve element in said valve body, said body having inlet and outlet ports, said displaceable valve element including land means defining a neutral closed center position and two fluid distributing positions, bypass means through which pressure fluid passes directly through the distributor valve as long as said displaceable valve element is in a bypass position defined by a slight displacement of said valve element with respect to said neutral closed center position, the provision of means indicating said bypass position and furnishing a manually detectable signal, said indicating means including two springs mounted to be successively compressed in response to movement of said valve element, the first of said springs being compressed upon displacement of said valve element as it moves from said neutral position to said bypass position, and the second of said springs being compressed upon displacement of said valve element as it moves from said bypass position to fluid distributing position.

2. A hydraulic distributor as claimed in claim 1 and a movable buffer engaging each end of each spring, means for moving at least one of the buffers of the first spring in response to movement of the valve element from said neutral position and means for moving one of the buffers for the second spring by means of the moving buffer of the first spring upon the valve element moving from the bypass position.

3. In a hydraulic distributor valve including a valve body, a displaceable valve element in said valve body, said body having inlet and outlet ports, said displaceable valve element including land means defining a neutral closed center position, two fluid distributing positions, and two bypass positions, one of said bypass positions being located between said neutral position and one of said fluid distributing positions, bypass means through which pressure fluid passes directly through the distributor valve as long as said displaceable valve element is in a bypass position defined by a slight displacement of said valve element with respect to said neutral closed center position, the improvement comprising indicating means on each side of said neutral position including a first spring, means associated therewith for compressing said spring in response to movement of said valve element as it moves from said neutral closed center position to the corresponding one of said fluid distributing positions, a second spring, and means associated therewith for compressing said second spring in response to movement of the corresponding valve element as it moves from said bypass position to said one of said fluid distributing positions.

4. A hydraulic distributor as claimed in claim 3 and a movable buffer engaging each end of each spring, means for moving at least one of the buffers of the first spring in response to movement of the valve element from said neutral position and means for moving one of the buffers for the second spring by means of the moving buffer of the first spring upon the valve element moving from the bypass position.

5. A hydraulic distributor for distributing fluid under pressure from a source to points of utilization, said distributor comprising a body having a longitudinally extending bore therein, said body having axially spaced, annular recesses defining fluid accommodating passages, said body also having a lateral shoulder defining an enlarged portion of said bore at one end thereof, a valve element disposed within the bore and having a plurality of axially spaced, peripheral grooves dimensioned to co-operate with the recesses in the body, said valve element having a tubular passage therein and two transversely extending port means providing communication between said tubular passage and whichever recess in the body is in registery with such port means, said body also having an axially disposed, outflow passage forming a continuation of the bore and in communication with said tubular passage in the valve element, said distributor body having inlet ports therein communicating with two axially spaced recesses in the body for admitting fluid under pressure so that such two recesses constitute pressure fluid receiving recesses, said body also having outlet port means communicating with two other axially spaced recesses in the body whereby pressure fluid can flow outwards to points of utilization, means for displacing said valve element axially within the bore, a washer fixed within the bore at the outer end of the enlarged portion thereof, said washer facing said lateral shoulder, said valve element having axially spaced facing shoulders thereon, oppositely directed flanged collars slidably surrounding said valve element and with the flanges thereof respectively engaging the shoulders on the valve element, a spring biased between the flanges of said collars, flanged buffer members slidably disposed within the enlarged portion of the bore in facing relation and respectively engaging the washer and first-mentioned lateral shoulder, a second spring biased between said flanged buffer members, said buffer members including flanges directed inwards towards the axis of the valve element a distance such as to be inwards of the outer ends of the flanges of the flanged collars, whereby said valve element is normally biased to a neutral position in which pressure fluid is locked within said pressure fluid receiving recesses in the bore, the last-mentioned flanges of the buffer members being spaced axially from the flanges of the collars in such neutral position whereby initial movement of the valve element in either direction compresses said first spring between the flanged collars and establishes communication between one of said pressure fluid receiving recesses and said tubular passage so that the pressure fluid can bypass the outlet port means, and continued movement of the valve element in the same direction continuing the compression of the first-mentioned spring and effecting engagement of the flange of the flanged collar member that is moving, with the inwardly directed flange of the adjacent buffer member for compressing said second spring, with the increased resistance occasioned by the cmopressing of the second spring indicating movement of the valve element from bypass position to a position in which pressure fluid flows from one of the pressure fluid receiving recesses to one of the recesses in the body that is in communication with an outlet port for a point of utilization.

References Cited by the Examiner

UNITED STATES PATENTS

| | | | |
|---|---|---|---|
| 1,554,010 | 9/1925 | Leal | 251—322 |
| 2,610,022 | 9/1952 | Meddock | 137—625.69 |
| 2,648,313 | 8/1953 | Clifton | 137—625.68 |
| 2,922,440 | 1/1960 | Hardy et al. | 137—621 XR |

M. CARY NELSON, *Primary Examiner.*

KARL J. ALBRECHT, MILTON KAUFMAN, MARTIN P. SCHWADRON, *Examiners.*